United States Patent
Li

(10) Patent No.: US 11,762,554 B2
(45) Date of Patent: Sep. 19, 2023

(54) METADATA VOLUME BITMAP DATA CONFLICT PROCESSING METHOD AND RELATED COMPONENTS

(71) Applicant: INSPUR SUZHOU INTELLIGENT TECHNOLOGY CO., LTD., Jiangsu (CN)

(72) Inventor: Yanhong Li, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/012,933

(22) PCT Filed: Jun. 30, 2021

(86) PCT No.: PCT/CN2021/103378
§ 371 (c)(1),
(2) Date: Dec. 25, 2022

(87) PCT Pub. No.: WO2022/052584
PCT Pub. Date: Mar. 17, 2022

(65) Prior Publication Data
US 2023/0266878 A1   Aug. 24, 2023

(30) Foreign Application Priority Data
Sep. 11, 2020   (CN) .......................... 202010954686.3

(51) Int. Cl.
G06F 3/06   (2006.01)
(52) U.S. Cl.
CPC ............ *G06F 3/0604* (2013.01); *G06F 3/067* (2013.01); *G06F 3/0659* (2013.01)

(58) Field of Classification Search
CPC ....... G06F 3/0604; G06F 3/0659; G06F 3/067
See application file for complete search history.

(56) References Cited

U.S. PATENT DOCUMENTS

| 2005/0081089 A1* | 4/2005 | Hayardeny ......... G06F 11/2074 714/6.12 |
| 2006/0026460 A1 | 2/2006 | Goldberg et al. |

(Continued)

FOREIGN PATENT DOCUMENTS

| CN | 102622286 A | 8/2012 |
| CN | 109445713 A | 3/2019 |

(Continued)

OTHER PUBLICATIONS

PCT/CN2021/103378 international search report.

*Primary Examiner* — Khoa D Doan
*Assistant Examiner* — Tong B. Vo
(74) *Attorney, Agent, or Firm* — IPRO, PLLC

(57) ABSTRACT

A metadata volume bitmap data conflict processing method. When the space allocation of a metadata volume encounters conflicts of 0-to-1 and 1-to-0, a conflict bit is set to be 1, so that when a garbage collector periodically performs space collection processing, data loss when data is overwritten due to collection of the bit to space corresponding to the bit in the case that I bit is detected to be 0 at one end may be avoided; when a conflict happens, conflict bits are both set to be 1, so that the conflict bits may be prevented from being allocated again, the space is prevented from being repeatedly allocated and repeatedly written and thus the data loss due to data overwriting is avoided, and after the garbage collection collects the conflict bits, continuous allocation may be performed, thereby implementing the repeated utilization of the conflict bits.

20 Claims, 5 Drawing Sheets

(56) References Cited

U.S. PATENT DOCUMENTS

| | | | | |
|---|---|---|---|---|
| 2014/0108753 | A1* | 4/2014 | Benhase | G06F 3/065 |
| | | | | 711/E12.103 |
| 2014/0108857 | A1 | 4/2014 | Brown et al. | |
| 2014/0344526 | A1* | 11/2014 | Brown | G06F 11/1458 |
| | | | | 711/141 |
| 2017/0249334 | A1* | 8/2017 | Karampuri | G06F 16/11 |
| 2017/0351606 | A1* | 12/2017 | Chakrabarti | G06F 16/00 |
| 2019/0188138 | A1* | 6/2019 | Guthrie | G06F 13/1663 |
| 2020/0401331 | A1* | 12/2020 | Mulani | G06F 12/0246 |
| 2021/0374155 | A1* | 12/2021 | Xiang | G06F 11/2094 |
| 2022/0197790 | A1* | 6/2022 | Palmer | G06F 12/0891 |

FOREIGN PATENT DOCUMENTS

| | | |
|---|---|---|
| CN | 111399772 A | 7/2020 |
| CN | 112114750 A | 12/2020 |

\* cited by examiner

METADATA VOLUME BITMAP DATA CONFLICT PROCESSING METHOD AND RELATED COMPONENTS

CROSS-REFERENCE TO RELATED APPLICATION

The present disclosure claims the priority of the Chinese patent application filed on Sep. 11, 2020 before the CNIPA, China National Intellectual Property Administration with the application number of 202010954686.3 and the title of "METADATA VOLUME BITMAP DATA CONFLICT PROCESSING METHOD AND RELATED COMPONENTS", which is incorporated herein in its entirety by reference.

FIELD

The present application relates to the technical field of storage systems and, more particularly, to a metadata volume bitmap data collision processing method, apparatus, device and a readable storage medium.

BACKGROUND

With the widespread use of SSDs (solid state disks or solid state drives), there have been some solutions for storage systems to be adapted to SSD in order to adapt to SSD for better performance. Existing research institutions and storage manufacturers are devoted to study how to adapt to SSD and propose an adaptation solution. The adaptation solution of the storage system and SSD includes the management of bitmap data (bitmap). Bitmap uses a bit to mark the Value corresponding to a certain element, and the current management methods of bitmap in a storage system adapted to SSD include the management of two types of bitmaps, i.e., a data volume bitmap and a metadata volume bitmap. The data volume bitmap is used to mark the state of the block in the data LSA volume, and the metadata bitmap is used to mark the state of each grain in the metadata LSA volume.

The bitmap is divided into a plurality of bitmap units with the size of 32 KB; in the operation process of a metadata volume, a modification operation needs to be performed on the bit in the Bitmap, and the modification is divided into two parts, i.e., setting 0 and setting 1; when the node modifies the value in the bitmap unit, the nodes on the both ends needs to be synchronized; when synchronizing, same is transmitted to the partner node according to a free bit framing in a bitmap_sector; while transmitting a data frame, bits are set in this node and Partner node in an asynchronous manner, and after completing brush-writing, a brush-writing result is obtained via a callback function, and the result is synchronized to partner node; and under a condition that the setting or the data-writing into disk fails, the synchronization needs to be continued.

At the same time, the garbage collection module of the metadata module may irregularly release some Blocks, which are reflected to the side of the LSA metadata volume, and the LSA metadata volume is required to modify the bit value in the bitmap corresponding to the Block from 1 to 0. A Set_Free_Block_List linked list is set in the node; when the garbage collection module releases the Block in a node, the Block is inserted into the linked list; the length of the linked list is detected in a sending thread; and under a condition that the length reaches a fixed value, the free_bit in the linked list is taken and typed into a data frame and sent to the partner node. After the node is sent to partner node, the two are modified asynchronously according to free bit, and after the modification of Partner node is completed, the modification results need to be synchronized to this node.

When a metadata volume bitmap sets and releases a certain bit, since the two operate asynchronously, it may not be able to operate according to an expected time sequence; at this time, a bit may be set and released at the same time, and the following is likely to occur: when a node A performs a release operation to a bit I, the partner node operation is required for the bit operation flow, and the local node operates after the partner node operation is completed. Thus, when B receives the release operation sent by A, B completes the operation, but has not yet replied to A; at this time, I bit is detected in B and is set; at this time, data inconsistency may be caused, with a negative impact on subsequent system processing, and there is currently no explicit solution for this problem.

Therefore, how to avoid the influence of data inconsistency easily occurring in a metadata volume bitmap operation on the long-term stable operation of a system is a problem to be solved by a person skilled in the art.

SUMMARY

An object of the present application is to provide a metadata volume bitmap data collision processing method, which may avoid the influence of data inconsistency that is easy to occur in a metadata volume bitmap operation on the long-term stable operation of a system; and it is another object of the present application to provide a metadata volume bitmap data collision processing apparatus, device, and a readable storage medium.

In order to solve the above-mentioned technical problem, the present application provides a metadata volume bitmap data collision processing method including:
- sending an asynchronous modification instruction for a bit I to a partner node by a node in the metadata volume bitmap;
- setting the bit I in both the node and the partner node as 1 after receiving feedback information that the partner node modification is unsuccessful; and
- subjecting the bit I to a space collection processing after initiating garbage collection.

In an embodiment, setting the bit I in both the node and the partner node as 1 after receiving feedback information that the partner node modification is unsuccessful includes:
- setting the bit I in the node as 1 after receiving feedback information that the partner node modification is unsuccessful; and
- setting the bit I in the partner node as 1 when the partner node is an initiator of an asynchronous modification instruction after receiving feedback information that the bit I modification is unsuccessful.

In an embodiment, after setting the bit I in the node as 1, further including: removing the bit I from a freelist.

In an embodiment, after setting the bit I in both the node and the partner node as 1, the method further includes: outputting setting collision prompt information.

The present application also provides a metadata volume bitmap data collision processing apparatus including:
- an instruction sending unit configured for sending an asynchronous modification instruction for a bit I to a partner node by a node in the metadata volume bitmap; and
- a collision bit setting unit configured for setting the bit I in both the node and the partner node as 1 after receiving feedback information that the partner node modification is unsuccessful; and a collision bit collection unit configured for subjecting the bit I to a space collection processing after initiating garbage collection.

In an embodiment, the collision bit setting unit includes:

a first setting subunit configured for setting the bit I in the node as 1 after receiving feedback information that the partner node modification is unsuccessful; and a second setting subunit configured for setting the bit I in the partner node as 1 when the partner node is an initiator of an asynchronous modification instruction after receiving feedback information that the bit I modification is unsuccessful.

In an embodiment, the first setting subunit is further configured for removing the bit I from a freelist.

In an embodiment, the metadata volume bitmap data collision processing apparatus further includes a prompt unit configured for outputting prompt information for setting a collision after setting the bit I in both the node and the partner node as 1.

The present application also provides a computer device including:

a memory configured for storing a computer program; and a processor configured for implementing the steps of the metadata volume bitmap data collision processing method when executing the computer program.

The present application also provides a readable storage medium having stored thereon a program which, when executed by a processor, implements the steps of the metadata volume bitmap data collision processing method.

According to the metadata volume bitmap data collision processing method provided in the present application, a collision bit is set as 1 when the space allocation of a metadata volume encounters a collision between modification of 0 to 1 and 1 to 0 to avoid that garbage collection will periodically perform space collection processing; when it is detected at one end that the I bit is 0, data loss caused by data overwriting and writing caused by the space corresponding to the bit will be recycled; and when the collision occurs, setting the I bit as 1 may prevent the collision bit from being reallocated again, and prevent the space from being repeatedly allocated and repeatedly written, thus avoiding data loss due to data overwriting, the garbage collection may continue to allocate after collecting the collision bits, enabling reuse of collision bits.

The present application also provides a metadata volume bitmap data collision processing apparatus, device, and a readable storage medium, with the above-mentioned beneficial effects, which will not be described in detail herein.

BRIEF DESCRIPTION OF THE DRAWINGS

In order to more clearly explain the technical solution in the embodiment or the existing technology of the present disclosure, the following will briefly introduce the drawings that need to be used in the embodiment or the existing technology description. Obviously, the drawings in the following description are only the embodiment of the present disclosure. For a person skilled in the art, other drawings may be obtained according to the provided drawings without paying creative labor.

DETAILED DESCRIPTION OF THE EMBODIMENTS

Figure 1:
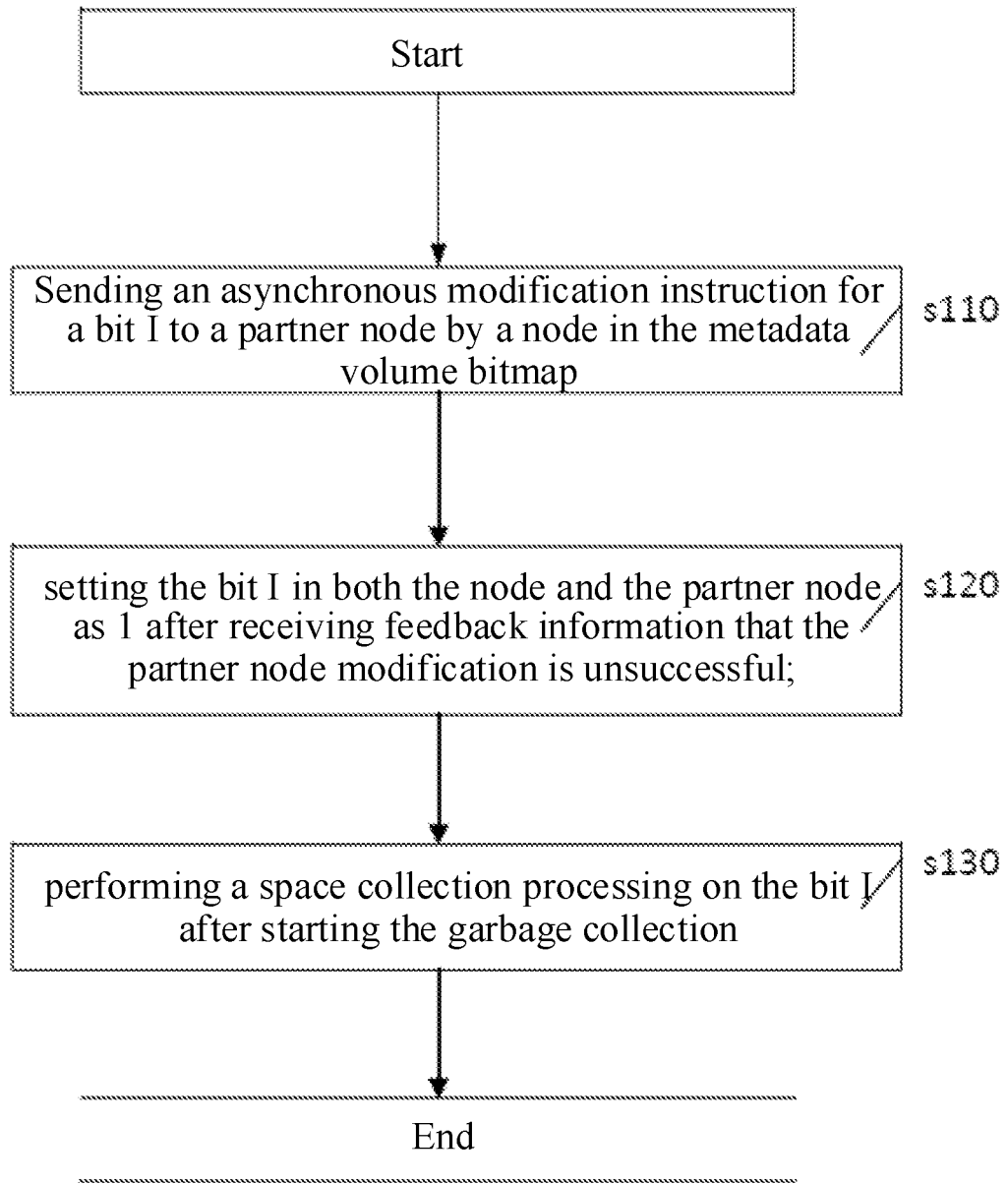
FIG. 1 is a flow chart of a metadata volume bitmap data collision processing method according to an embodiment of the present application.

A focus of the present application is to provide a metadata volume bitmap data collision processing method, wherein the method may significantly improve the implementation efficiency of metadata volume bitmap data collision processing, thereby providing reliable support for further space collection and data management; another focus of the present application is to provide a metadata volume bitmap data collision processing apparatus, device, and a readable storage medium.

In order that the objects, aspects, and advantages of the embodiments of the present invention will become more apparent, a more complete description of the embodiments of the present invention will be rendered by reference to the appended drawings, which are provided for purposes of illustration and are not intended to be exhaustive or limiting of the present invention. Based on the embodiments in the present application, all other embodiments obtained by a person skilled in the art without involving any inventive effort are within the scope of protection of the present application.

When the node in the metadata module modifies the value in the bitmap unit, it is necessary to synchronize the nodes on the both ends, and the bit value may be directly sent, and the corresponding bitmap space is 1M, reflecting that the bit directly corresponding to the PBA represents that it needs 20 bits to represent a complete PBA.

If the number of modified bits is relatively large, multi-frame transmission is required, since data-writing into disk in a single node mode is performed in the unit of bitmap_sector, when synchronizing, same is transmitted to the partner node according to a free bit framing in a bitmap_sector; while transmitting a data frame, the bits are set in this node and Partner node in an asynchronous manner, and after completing the brush-writing, a brush-writing result is obtained via a callback function, and the result is synchronized to the partner node. Under a condition that the setting or the data-writing into disk fails, the synchronization needs to be continued.

The garbage collection module of the metadata module may irregularly release some Blocks, which are reflected to the side of the LSA metadata volume, and the LSA metadata volume is required to modify the bit value in the bitmap corresponding to the Block from 1 to 0. Since the release of Block by the garbage collection module is irregular, bitmap synchronization operation may not be performed every time Block is released, and CPU performance will be consumed in this way. A Set_Free_Block_List linked list will be set in the node; when the garbage collection module releases the Block in the node, the Blocks are inserted into the linked list; the length of the linked list is detected in the sending thread; under a condition that the length reaches a fixed value, the free_bit in the linked list is taken out and typed into a data frame, and is sent to the partner node; in the process of taking a value from the Set_Free_Block_List linked list, locking may not be used, and the Blocks to be released may also be continuously inserted, and one with the maximum number is taken out as the fixed value. Set_Free_Block_List is detected in the timing function and on a condition that the linked list is not empty, the send function is called.

After the node is sent to the partner node, both are modified asynchronously according to free bit, and after the modification of Partner node is completed, the modification results need to be synchronized to this node.

When a metadata volume bitmap sets and releases a certain bit, since the two operate asynchronously, it may not be able to operate according to an expected time sequence; at this time, a bit may be set and released at the same time, and the following is likely to occur: when a node A performs a release operation to a bit I, the partner node operation is required for the bit operation flow, and the local node operates after the partner node operation is completed. In this way, when B receives the release operation sent by A, B completes the operation, but has not yet replied to A, I bit is detected in B and is set, which may cause data inconsistency, and corresponding processing is performed for this case.

Space allocation of data volumes is controlled at one end of the primary side, so there is no inconsistency between the both ends. The space allocation of the metadata volume is required to be allocated at both ends, and it is possible to collide with modification of 0 to 1 and 1 to 0.

The present application provides a metadata volume bitmap data collision processing method, which may eliminate the influence of data collision processing on the normal operation of a subsequent system. With reference to FIG. 1, which is a flow chart of a metadata volume bitmap data collision processing method provided in the embodiment, and the method mainly includes:

step s110, sending an asynchronous modification instruction for a bit I to a partner node by a node in the metadata volume bitmap;

Here, bit I refers to any bit indicating that the present application is applicable to data collisions occurring in any bit modification in the metadata volume bitmap.

The modification instruction in the metadata volume bitmap may also be referred to as a set instruction, and since the bit setting in the metadata volume bitmap is an asynchronous operation, the modification instruction sent is an asynchronous modification instruction.

When node modifies the value in the bitmap unit, it is necessary to synchronize the nodes on the both ends; after the nodes are sent to partner node, they are modified according to free bit asynchronization; after Partner node modification is completed, it is necessary to synchronize the modification result to this node.

Step s120, setting the bit I in both the node and the partner node as 1 after receiving feedback information that the partner node modification is unsuccessful;

under a condition that the partner node feedback modification is unsuccessful in the setting process, a setting collision occurs; at this time, since there is garbage collection, space collection processing will be periodically performed; when it is detected that the I bit is 0 at one end, the space corresponding to the bit will be collected, and the I bits at both ends will be modified to 0 and become consistent.

Inconsistency is only a temporary state and is set as 1 when there is a collision in order to prevent re-allocation, to prevent space from being repeatedly allocated and repeatedly written, and to avoid data loss due to data overwriting. When it is set as 1, although a small block of space corresponding to the bit may not be allocated until the garbage collection collects it, this effect is relatively small, and there is no effect on data and IO, so that collision processing may be achieved.

In the embodiment, there is no limitation on the implementation method of setting 1, and the collision bits in the partner node and the node may be set as 1 immediately when the collision occurs; In an embodiment, after receiving feedback information that the partner node modification is unsuccessful, the implementation process of setting the bit I in both the node and the partner node as 1 may be as follows:

(1) setting the bit I in the node as 1 after receiving feedback information that the partner node modification is unsuccessful;

(2) setting the bit I in the partner node as 1 when the partner node is an initiator of an asynchronous modification instruction after receiving feedback information that the bit I modification is unsuccessful.

When a collision occurs, only the collision bit of the instruction initiator is modified, which may avoid modifying errors and simplify the implementation steps at a same time, thereby improving the efficiency of collision processing.

In addition, after setting the bit I in the node as 1, the bit I may also be removed from the freelist, and after setting the bit I in the partner node as 1, the bit I may also be removed from the freelist of the partner node, to avoid repeated occupation.

It should be noted that after receiving the feedback information that the partner node modification is unsuccessful, after the collision processing is performed, in order to realize the statistics of the occurrence of the collision and facilitate a subsequent technician to perform maintenance processing according thereto, in an embodiment, the prompt information for setting the collision may be further output, of course, this step may not be performed, which is not limited in the embodiment.

Step s130, subjecting the bit I to a space collection processing after initiating garbage collection.

Since in the present application, after a collision occurs, it is set to be 1, although a small block of space corresponding to the bit may not be allocated until the garbage collection collects it, this effect is relatively small, and there is no effect on data and TO, so that collision processing may be achieved.

However, the implementation process of performing space collection processing to the bit I after starting the garbage collection is not limited in this embodiment, and reference may be made to the implementation mode in the related art.

Based on the above-mentioned introduction, according to the metadata volume bitmap data collision processing method introduced in the embodiment, a collision bit is set as 1 when the space allocation of a metadata volume encounters a collision between modification of 0 as 1 and 1 to 0 to avoid that garbage collection will periodically perform space collection processing; when it is detected at one end that the I bit is 0, data loss caused by data overwriting and writing caused by the space corresponding to the bit will be recycled; and when the collision occurs, setting the I bit as 1 may prevent the collision bit from being reallocated again, and prevent the space from being repeatedly allocated and repeatedly written, thus avoiding data loss due to data overwriting, the garbage collection may continue to allocate after collecting the collision bits, enabling reuse of collision bits.

In order to improve understanding, a way of dealing with bitmap data collision between node A and node B is taken as an example to describe in this embodiment.

Figure 2:
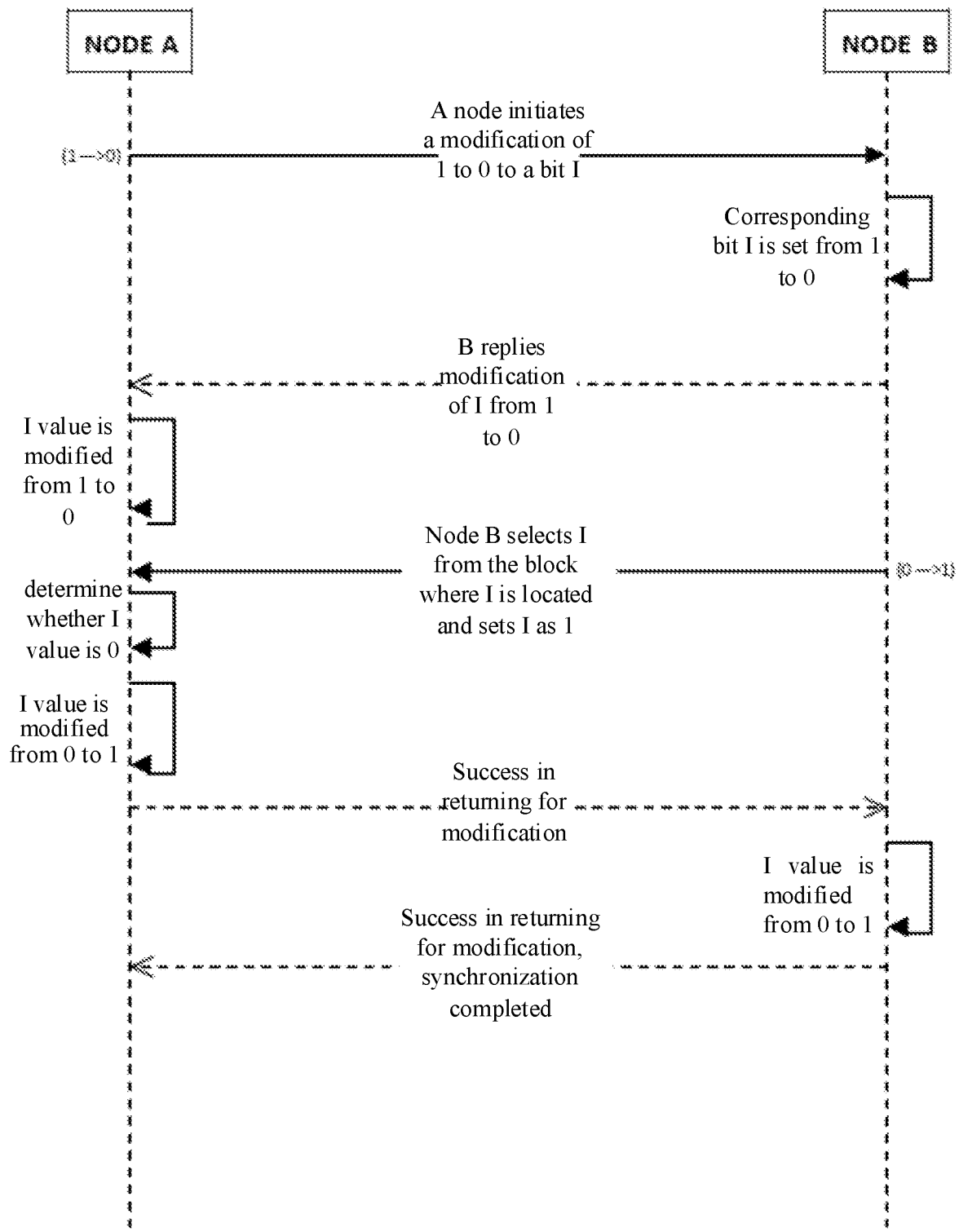
FIG. 2 is a schematic diagram of a metadata volume asynchronous modification node according to an embodiment of the present application.

FIG. 2 shows a metadata volume asynchronous modification node diagram. When the node A initiates a modification (setting) of a bit I from 1 to 0, the node B is firstly notified to set the bit I from 1 to 0, and after receiving same, the node B sets the bit I from 1 to 0, and replies that the node A has completed the modification of the bit I from 1 to 0, after receiving the modification completion information fed back by the node B, the node A modifies the bit I on its own node from 1 to 0; at this moment, the node B selects I from the block where I is located, and sets same as 1; firstly, the node A determines whether the I value therein is 0; if so, the node A modifies the I value from 0 to 1, and returns feedback information about successful modification to the node B; after receiving same, the node B modifies the I value from 0 to 1, and feedback information about successful modification to the node A, and completes prompt information about synchronization.

The above is the implementation process when node A first receives an operation of modifying 1 to 0, and the setting and releasing are normal when processing according to this process.

Figure 3:
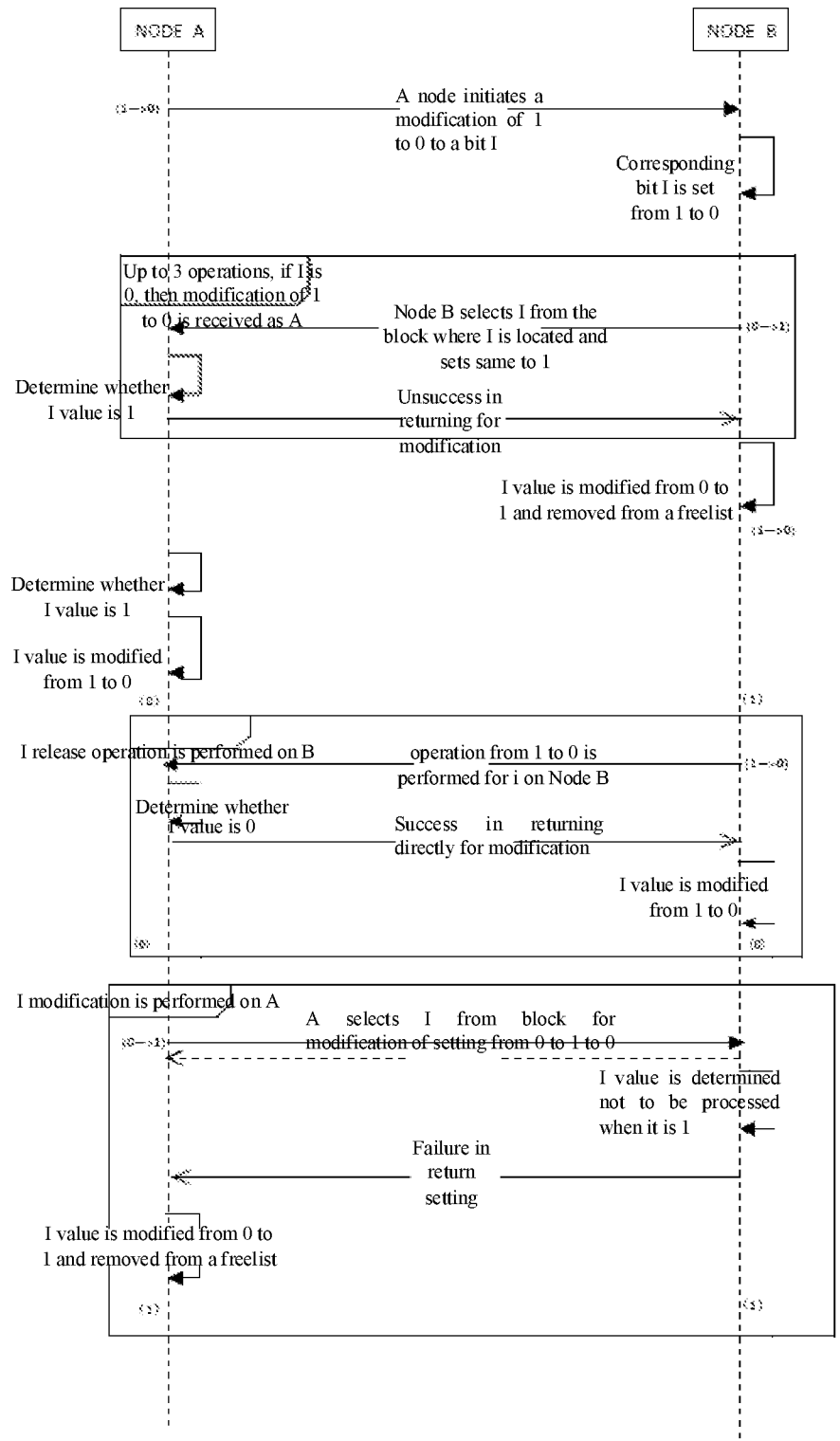
FIG. 3 is a schematic diagram of an implementation flow when a node is modified according to an embodiment of the present application.

However, the implementation flow when the node A first receives the modification from 0 to 1 is as shown in FIG. 3; when the node A initiates the modification (setting) of a bit I from 1 to 0, the node B is firstly notified to set the bit I from 1 to 0; after receiving the modification, the node B sets the bit I from 1 to 0; at this moment, the node B selects I from the block where I is located and sets I as 1; and firstly, the node A determines whether the value of I therein is 0; since the node B completes the modification of setting, but the node A does not complete, the I value in the node A is not 0, and the node A returns feedback information that the modification is unsuccessful to the node B; in the present application, when the bit value is inconsistent with the commanded modification, the node B sets the I value as 1, modifies the I value from 0 to 1, and removes the I from the freelist, and the node B replies to the node A to modify the I from 1 to 0; node A determines whether the bit I value is 1, and if so, modifies bit I from 1 to 0.

When an I release operation is performed on the node B at this moment, the node B performs an operation from 1 to 0 on I, and the node A determines whether the I value is 0, and if so, feedback information about successful modification is directly returned, and the node B modifies the I value from 1 to 0.

At this moment, when an I modification operation is performed on the node A, the node A selects I from the block to perform setting from 0 to 1, the node B finds that the I value is 1, and does not perform processing, and fails to return to setting; in the present application, when the bit value is inconsistent with the commanded modification, the node A modifies the I value from 0 to 1, and removes I from the freelist.

Since there is garbage collection, space collection processing will be periodically performed; when it is detected that the I bit is 0 at one end, the space corresponding to the bit will be collected, and the I bits at both ends will be modified to 0 and become consistent.

Figure 4:
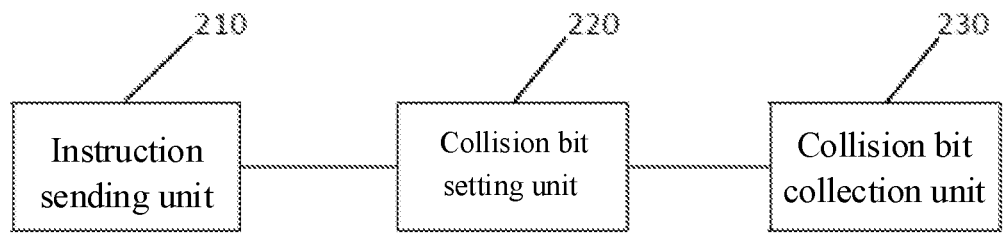
FIG. 4 is a block diagram showing the structure of a metadata volume bitmap data collision processing apparatus according to an embodiment of the present application.

Referring to FIG. 4, which is a block diagram showing the structure of a metadata volume bitmap data collision processing apparatus according to the embodiment. The apparatus mainly includes: an instruction sending unit 210, a collision bit setting unit 220, and a collision position collection unit 230. The metadata volume bitmap data collision processing apparatus provided in the embodiment may be compared with the metadata volume bitmap data collision processing method described above.

The instruction sending unit 210 is mainly configured for sending an asynchronous modification instruction for a bit I to a partner node by a node in the metadata volume bitmap;

the collision bit setting unit 220 is mainly configured for setting the bit I in both the node and the partner node as 1 after receiving feedback information that the partner node modification is unsuccessful; and the collision bit collection unit 230 is mainly configured for subjecting the bit I to a space collection processing after initiating garbage collection.

In an embodiment, the collision bit setting unit 220 may include:

a first setting subunit configured for setting the bit I in the node as 1 after receiving feedback information that the partner node modification is unsuccessful; and a second setting subunit configured for setting the bit I in the partner node as 1 when the partner node is an initiator of an asynchronous modification instruction after receiving feedback information that the bit I modification is unsuccessful.

In an embodiment, the first setting subunit is further configured for removing the bit I from a freelist.

In an embodiment, the metadata volume bitmap data collision processing apparatus may further include a prompt unit configured for outputting prompt information for setting a collision after setting the bit I in both the node and the partner node as 1.

The embodiment provides a computer device mainly including: a memory and a processor. Wherein the memory is configured for storing a program;

The processor, when executing a program, implements the steps of the metadata volume bitmap data collision processing method as described in the above embodiments, and reference may be made to the introduction to the metadata volume bitmap data collision processing method.

Figure 5:
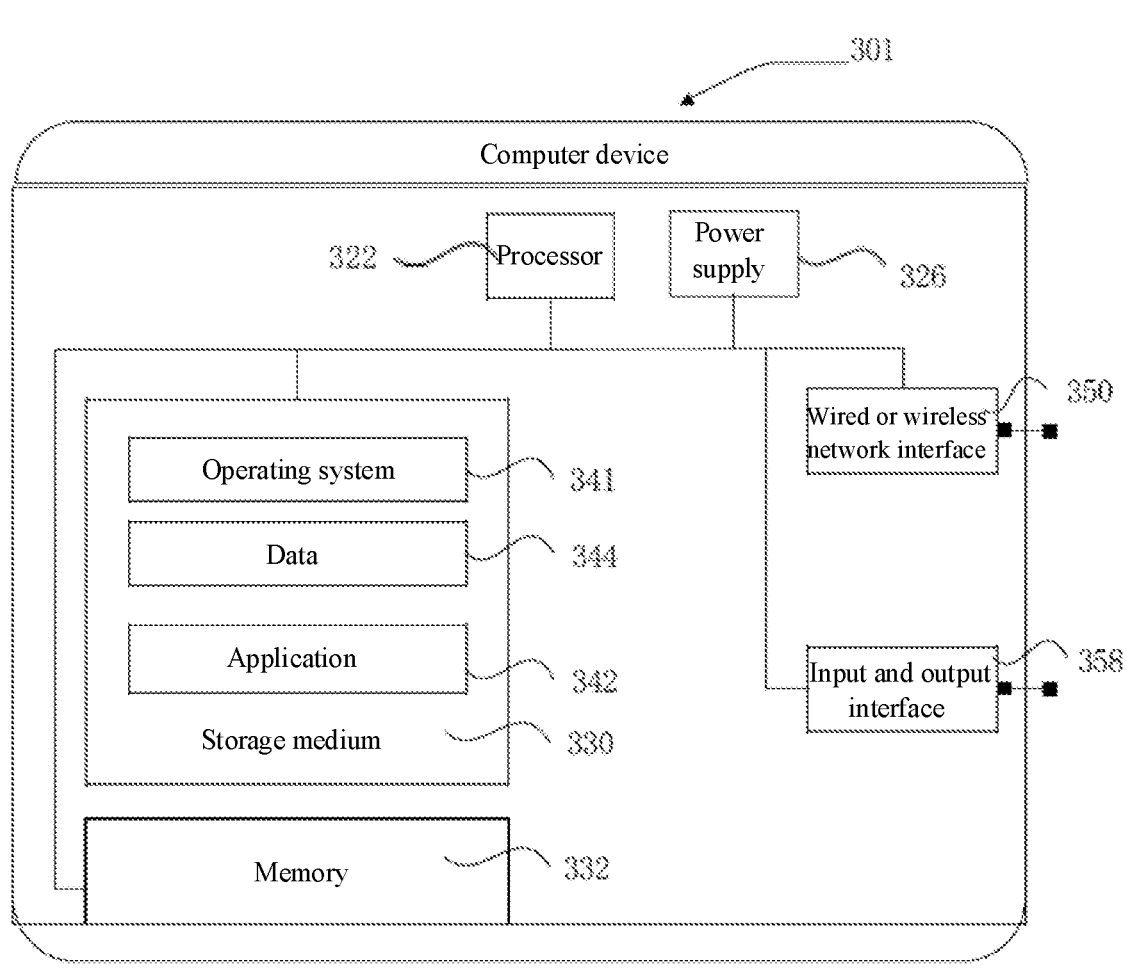
FIG. 5 is a schematic view of a computer device according to an embodiment of the present application.

Referring to FIG. 5, a block diagram of a computer device that may vary widely in configuration or performance and that may include one or more central processing units (CPUs) 322 (e.g. one or more processors) and a memory 332, one or more storage mediums 330 (e.g. one or more mass computer devices) that store applications 342 or data 344. The memory 332 and storage mediums 330 may be transient storage or persistent storage. A program stored on the storage medium 330 may include one or more modules (not shown), each of which may include a series of instruction operations on a data processing device. Still further, the central processing unit 322 may be configured to communicate with the storage medium 330 to execute a series of instruction operations on the storage medium 330 on the computer device 301.

The computer device 301 may also include one or more power supplies 326, one or more wired or wireless network interfaces 350, one or more input and output interfaces 358, and/or one or more operating systems 341, such as Windows Server™, Mac OS X™, Unix™, Linux™, FreeBSD™, etc.

The steps in the metadata volume bitmap data collision processing method described above in FIG. 1 may be implemented by the structure of the computer device described by this embodiment.

The present embodiment discloses a readable storage medium, on which a program is stored, and when the program is executed by a processor, the steps of a metadata volume bitmap data collision processing method as described in the above-mentioned embodiment are implemented, and reference may be made to the introduction to the metadata volume bitmap data collision processing method in the above-mentioned embodiment.

The readable storage medium may be a U-disk, a removable hard disk, a read-only memory (ROM), a random access memory (RAM), a magnetic disk or an optical disk which may store a program code.

Figure 6:
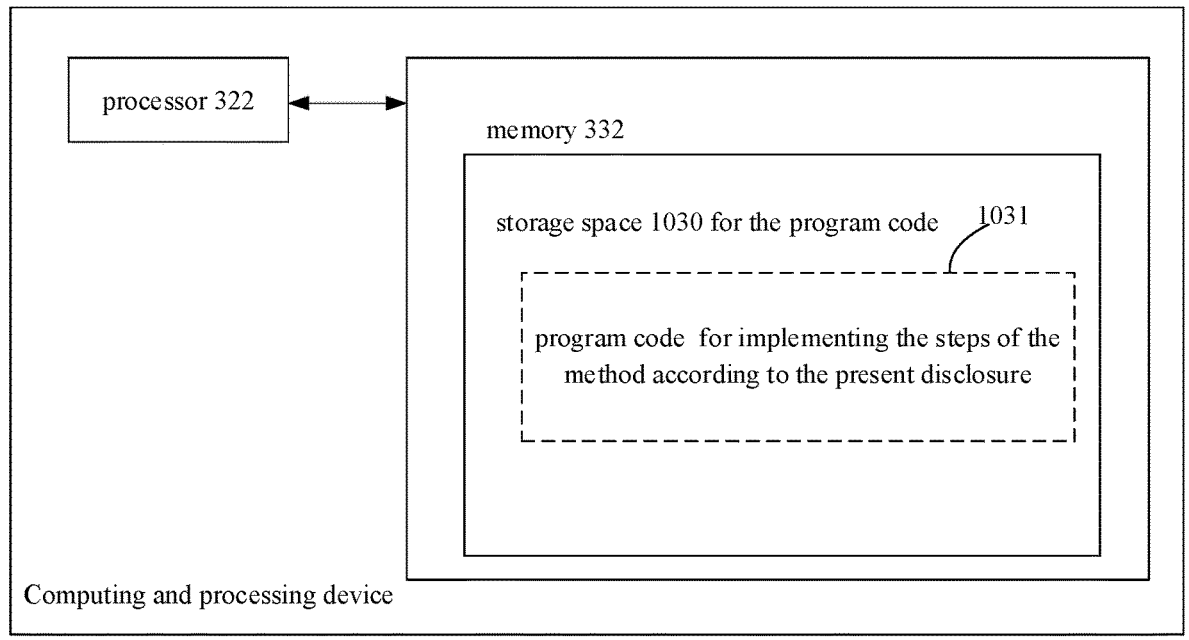
FIG. 6 schematically shows a block diagram of a computing processing device for executing the method according to the present disclosure.
Figure 7:
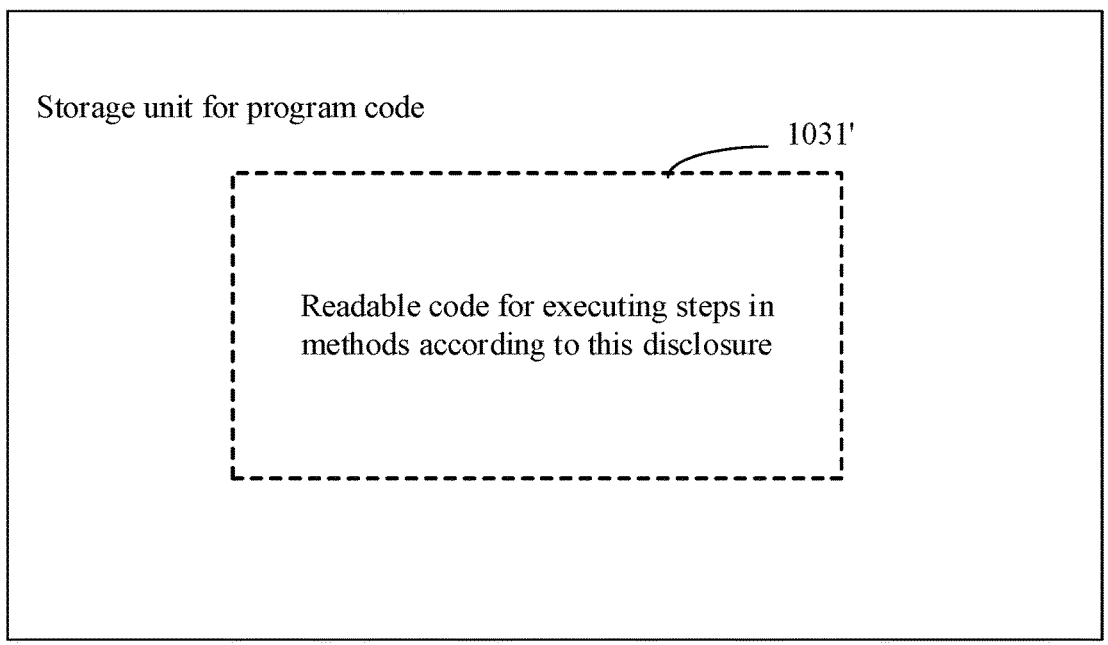
FIG. 7 schematically shows a storage unit for holding or carrying program codes for implementing the method according to the present disclosure.

For example, FIG. 6 shows a computing and processing device that can implement the method according to the present disclosure. The computing and processing device traditionally includes a processor 322 and a computer program product or computer-readable medium in the form of a memory 332. The memory 332 may be electronic memories such as flash memory, EEPROM (Electrically Erasable Programmable Read Only Memory), EPROM, hard disk or ROM. The memory 332 has the storage space 1030 of the program code 1031 for implementing any steps of the above method. For example, the storage space 1030 for program code may contain program codes 1031 for individually implementing each of the steps of the above method. Those program codes may be read from one or more computer program products or be written into the one or more computer program products. Those computer program products include program code carriers such as a hard disk, a compact disk (CD), a memory card or a floppy disk. Such computer program products are usually portable or fixed storage units as shown in FIG. 7. The storage unit may have storage segments or storage spaces with similar arrangement to the memory 332 of the computing and processing device in FIG. 6. The program codes may, for example, be compressed in a suitable form. Generally, the storage unit contains a computer-readable code 1031', which can be read by a processor like 322. When those codes are executed by the computing and processing device, the codes cause the computing and processing device to implement each of the steps of the method described above.

Various embodiments are described in the specification progressively, with each embodiment focusing on differences from the other embodiments, and with reference to one another, the embodiments have their same or similar parts explained. The system disclosed in the embodiments corresponds to the method disclosed in the embodiments, and is thus described in a relatively simple manner, that is, reference may be made to the embodiments of the method to understand the relevant parts of the system.

A person skilled in the art may further realize that the units and algorithm steps of each example described in combination with the examples disclosed herein may be realized by electronic hardware, computer software or a combination of the two. In order to clearly explain the interchangeability of hardware and software, the composition and steps of each example have been described generally according to the functions in the above instructions. Whether these functions are implemented in hardware or software depends on the application and design constraints of the technical solution. A person skilled in the art may use different methods to implement the described functions for each application, but this implementation should not be considered beyond the scope of the present application.

The steps of the method or algorithm described in combination with the embodiment described in the specification may be directly implemented by hardware, software modules executed by the processor, or a combination of the two. Software modules may be placed in random access memory (RAM), memory, read-only memory (ROM), electrically programmable ROM, electrically erasable programmable ROM, register, hard disk, removable disk, CD-ROM, or any other form of storage medium known in the art.

The metadata volume bitmap data collision processing method, apparatus, device and the readable storage medium provided by the present application above are described in detail. In this specification, examples are used to explain the principle and implementation of the present application. The embodiments above are only used to help understand the method and core idea of the present application. It should be pointed out that for a person skilled in the art, some improvements and modifications may be made to the present application without deviating from the principle of the present application. These improvements and modifications also fall within the scope of protection of the claims in the present application.

The invention claimed is:

1. A metadata volume bitmap data collision processing method, comprising:
   sending an asynchronous modification instruction for a bit I to a partner node by a node in a metadata volume bitmap;
   setting the bit I in both the node and the partner node as 1 after receiving feedback information that a partner node modification is unsuccessful; and
   subjecting the bit I to a space collection processing after initiating a garbage collection.

2. The metadata volume bitmap data collision processing method according to claim 1, wherein setting the bit I in both the node and the partner node as 1 after receiving feedback information that the partner node modification is unsuccessful comprises:
   setting the bit I in the node as 1 after receiving the feedback information that the partner node modification is unsuccessful; and
   setting the bit I in the partner node as 1 when the partner node is an initiator of an asynchronous modification instruction after receiving the feedback information that a bit I modification is unsuccessful.

3. The metadata volume bitmap data collision processing method according to claim 2, after setting the bit I in the node as 1, further comprising: removing the bit I from a freelist.

4. The metadata volume bitmap data collision processing method according to claim 3, wherein after setting the bit I in the partner node as 1, further comprising: removing the bit I from a freelist of the partner node.

5. The metadata volume bitmap data collision processing method according to claim 2, wherein when a collision occurs, only a collision bit of the initiator is modified.

6. The metadata volume bitmap data collision processing method according to claim 1, wherein after setting the bit I in both the node and the partner node as 1, the method further comprises: outputting setting collision prompt information.

7. The metadata volume bitmap data collision processing method according to claim 1, wherein the bit I refers to any bit indicating data collisions occurring in any bit modification in the metadata volume bitmap.

8. A computer device, comprising:
a memory configured for storing a computer program; and
a processor configured for implementing the steps of the metadata volume bitmap data collision processing method according to claim 1 when executing the computer program.

9. The computer device according to claim 8, wherein the operation of setting the bit I in both the node and the partner node as 1 after receiving feedback information that the partner node modification is unsuccessful comprises:
setting the bit I in the node as 1 after receiving the feedback information that the partner node modification is unsuccessful; and
setting the bit I in the partner node as 1 when the partner node is an initiator of an asynchronous modification instruction after receiving the feedback information that a bit I modification is unsuccessful.

10. The computer device according to claim 9, wherein after the operation of setting the bit I in the node as 1, further comprising: removing the bit I from a freelist.

11. The computer device according to claim 10, wherein after setting the bit I in the partner node as 1, further comprising: removing the bit I from a freelist of the partner node.

12. The computer device according to claim 9, wherein when a collision occurs, only a collision bit of the initiator is modified.

13. The computer device according to claim 8, wherein the operations further comprise: outputting setting collision prompt information.

14. The computer device according to claim 8, wherein the bit I refers to any bit indicating data collisions occurring in any bit modification in the metadata volume bitmap.

15. A non-transitory computer-readable storage medium, storing a computer program that is executed by a processor, and upon execution by the processor, is configured to cause the processor to implement the steps of the metadata volume bitmap data collision processing method according to claim 1.

16. The non-transitory computer-readable storage medium according to claim 15, wherein the operation of setting the bit I in both the node and the partner node as 1 after receiving feedback information that the partner node modification is unsuccessful comprises:
setting the bit I in the node as 1 after receiving the feedback information that the partner node modification is unsuccessful; and
setting the bit I in the partner node as 1 when the partner node is an initiator of an asynchronous modification instruction after receiving the feedback information that a bit I modification is unsuccessful.

17. The non-transitory computer-readable storage medium according to claim 16, wherein the operations further comprise: removing the bit I from a freelist.

18. The non-transitory computer-readable storage medium according to claim 16, wherein when a collision occurs, only a collision bit of the initiator is modified.

19. The non-transitory computer-readable storage medium according to claim 15, wherein the operations further comprise: outputting setting collision prompt information.

20. The non-transitory computer-readable storage medium according to claim 15, wherein the bit I refers to any bit Indicating data collisions occurring in any bit modification in the metadata volume bitmap.

* * * * *